US011615316B1

United States Patent
Kendall (10) Patent No.: US 11,615,316 B1
(45) Date of Patent: Mar. 28, 2023

(54) MACHINE LEARNING USING GRADIENT ESTIMATE DETERMINED USING IMPROVED PERTURBATIONS

(71) Applicant: Rain Neuromorphics Inc., San Francisco, CA (US)

(72) Inventor: Jack David Kendall, San Mateo, CA (US)

(73) Assignee: Rain Neuromorphics Inc., San Francisco, CA (US)

( * ) Notice: Subject to any disclaimer, the term of this patent is extended or adjusted under 35 U.S.C. 154(b) by 0 days.

(21) Appl. No.: 17/948,108

(22) Filed: Sep. 19, 2022

(51) Int. Cl.
*G06N 3/04* (2006.01)
*G06N 3/08* (2006.01)
*G06N 3/084* (2023.01)

(52) U.S. Cl.
CPC ........... *G06N 3/084* (2013.01); *G06N 3/0445* (2013.01); *G06N 3/0454* (2013.01); *G06N 3/0472* (2013.01)

(58) Field of Classification Search
CPC ....... G06N 3/0445; G06N 3/0454; G06N 3/08
See application file for complete search history.

(56) References Cited

U.S. PATENT DOCUMENTS

| | | | | |
|---|---|---|---|---|
| 2020/0104678 A1* | 4/2020 | Nixon | ................... | G06N 3/0472 |
| 2020/0285939 A1* | 9/2020 | Baker | ................... | G06N 3/0445 |
| 2020/0372353 A1* | 11/2020 | Qin | ..................... | G06V 10/764 |

OTHER PUBLICATIONS

Lee, Hyeungill, Sungyeob Han, and Jungwoo Lee. "Generative adversarial trainer: Defense to adversarial perturbations with gan." arXiv preprint arXiv:1705.03387 (2017). (Year: 2017).*
Hirano, Hokuto, and Kazuhiro Takemoto. "Simple iterative method for generating targeted universal adversarial perturbations." Algorithms 13.11 (2020): 268. (Year: 2020).*
Jeddi, Ahmadreza, et al. "Learn2perturb: an end-to-end feature perturbation learning to improve adversarial robustness." Proceedings of the IEEE/CVF Conference on Computer Vision and Pattern Recognition. 2020. (Year: 2020).*
Arild Nokland, Direct Feedback Alignment Provides Learning in Deep Neural Networks, 30th Conference on Neural Information Processing Systems (NIPS 2016), Barcelona, Spain, pp. 1-9.
James C. Spall, A One-Measurement Form of Simultaneous Perturbation Stochastic Approximation, Automatica, vol. 33, No. 1, 1997, pp. 109-112.
Lillicrap et al., Random Synaptic Feedback Weights Support Error Backpropagation for Deep Learning, Published Nov. 8, 2016, pp. 1-10.

* cited by examiner

*Primary Examiner* — Hal Schnee
(74) *Attorney, Agent, or Firm* — Van Pelt, Yi & James LLP (57) ABSTRACT

A method of training a learning network is described. The method includes generating a first estimate of a gradient for the learning network and generating subsequent estimates of the gradient using a feedback network. The feedback network generates improved perturbations for the subsequent gradient estimates. Gradient estimates include the first estimate of the gradient and the subsequent estimates of the gradient. The method also includes using the gradient estimates to determine weights in the learning network. The improved perturbations may include lower variance perturbations.

20 Claims, 4 Drawing Sheets

MACHINE LEARNING USING GRADIENT ESTIMATE DETERMINED USING IMPROVED PERTURBATIONS

BACKGROUND OF THE INVENTION

In order to perform machine learning in hardware the desired output is to be achieved from a particular set of input data. For example, input data (e.g. an input vector) is provided to a first layer. The input data is multiplied by a matrix of values, or weights, for the layer. The output signals (or output vector) for the layer are the result of the matrix multiplication in the layer. The output signals are provided as the input signals to the next layer of matrix multiplications. This process may be repeated for a large number of layers, each of which may include a number of neurons. The final output signals of the last layer are desired to match a particular set of target values. To perform machine learning, the weights (e.g. resistances) for one or more of the layers are adjusted in order to bring the final output signals closer to the target values. Although this process can theoretically alter the weights of the layers to provide the target output, in practice, ascertaining the appropriate set of weights is challenging. Various techniques exist in order to aid in determining the weights. However, each of these techniques also face significant issues.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Learning networks (e.g. artificial neural networks) utilized in machine learning, or deep learning, are generally many-layered or hierarchical structures. Layers of neurons (or nodes) are interleaved with weights. The input signals (e.g. an input vector) for a layer are multiplied by a matrix of values, or weights. The weights can be implemented as an array of programmable resistances, with the resistances serving as weights. The resultant signals of the input signals multiplied by the weights are provided as input signals (e.g. weighted inputs) to a layer of neurons. Neurons (e.g. hardware neurons) in the layer combine the weighted inputs using some function and provide output signals for the layer. The output signals of the layer of neurons are provided as input signals to the next set of weights. This may be repeated for the remaining weights and neuron layers of the learning network. The final output signals of the last layer are typically the output signals for the learning network.

Machine learning involves evaluating the final output signals of the last layer based on a set of target values (e.g. the desired output signals) for a given set of input signals provided to the network. To improve the correlation between the output signals and the target values, the weights for one or more of the layers are adjusted to reduce the difference between the final output signals and the target values. The loss function may be defined as a quantification of the network's performance for a particular task, or error from a desired set of outputs. For example, the loss function may be the square of the difference between the output signals of the learning network and the target values. The gradient of the loss function with respect to the weights (e.g. the impedances or conductances at the synapses) indicates how each weight should be adjusted in order to achieve the desired result. In practice, however, the precise value of the gradient is difficult to calculate. Determining how to adjust the weights to achieve the target based on the output is, therefore, challenging.

Various techniques exist in order to aid in determining the desired weights. For example, back propagation might be desired to be used to adjust the weights for each layer. To do so, the gradient for each layer is explicitly calculated. However, calculating the gradient for each layer may require an exact model of the learning network. Such a model may be challenging to construct. For analog networks, which may have variations between individual devices, back propagation becomes even more problematic. In practice, therefore, back propagation may be unusable for performing machine learning in hardware networks. Other techniques used in machine learning may also face significant issues. For example, equilibrium propagation can be used to locally estimate gradients for a static learning network having static input signals. However, equilibrium propagation utilizes a symmetric network, which constrains the learning networks that may be used. Simultaneous perturbation stochastic approximation (SPSA) uses injected random signals (e.g., noise) to the layers. Changes in the final output (and thus the loss function) for the injected noise allows the gradients to be estimated and the weights in the learning network adjusted. However, the variance of the noise signals corresponding to the desired gradient may be high. Stated differently, the signal to noise ratio in the gradients is low. Thus, the number of inferences (and time) taken to arrive at a stable gradient and, therefore, acceptable values of the weights may be undesirably large. In feedback alignment, the loss function is used to provide a gradient for the last layer of the network. Random feedback matrices are multiplied by this gradient and input to the weights, which are updated. However, feedback alignment also has restrictions on the topology of the network. Other issues exist for these techniques. Accordingly, an improved mechanism for performing machine learning is desired.

A method of training a learning network is described. The method includes generating a first estimate of a gradient for the learning network using injected noise perturbations, and generating subsequent predictions of the gradient using a feedback network that generates improved perturbations over time. A plurality of gradient estimates includes the first stochastic approximation of the gradient and the subsequent predictions of the gradient. The method also includes using the plurality of gradient estimates to determine weights in the learning network. In some embodiments, the improved perturbations include lower-variance perturbations. In some embodiments, the improved perturbations are balanced and have a finite inverse second moment. The improved perturbations may be determined based on importance sampling of a perturbation distribution.

Using the gradient estimates to determine the weights may further include iteratively determining the weights in the learning network. In some such embodiments, generating subsequent estimates includes receiving at the feedback network for an iteration, a target of the predicted gradient estimates. Perturbations for the iteration are determined using the feedback network and the gradient prediction. Determining the perturbations for the iteration may also include updating feedback weights for the feedback network based on the gradient estimate. The perturbations are provided to the learning network. A new gradient estimate of the gradient estimates is provided for the iteration based on the perturbations. Stated differently, in some embodiments, for an iteration, an inference is performed for the learning network using the current values of the weights and perturbations from a previous iteration. Thus, a gradient estimate is obtained via stochastic approximation. The gradient estimate is used to update the feedback weights of the feedback network. More specifically, a loss function for the gradient estimate may be provided to the feedback network and used to update the feedback weights. The feedback network obtains a prediction of the gradient based on feedback weights and determines perturbations for the current iteration based on the gradient prediction. An inference for the next iteration may then be performed. Thus, the feedback weights and the (feed forward) weights may be considered to be updated based on the gradient estimates obtained from the learning network via stochastic approximation and gradient predictions obtained by the feedback network. In some such embodiments, iteratively determining the weights further includes updating the weights in the learning network based on the new gradient estimate. In some such embodiments, iteratively determining the weights includes updating the weights in the learning network after determination of a final gradient estimate.

The gradient estimates may include output layer gradient estimates. The output layer is a last layer of a plurality of layers in the learning network. In some embodiments, the learning network is a neural network. The learning network may have multiple layers. Each of the layers includes neurons having inputs and outputs. A portion of the weights are between the outputs of a layer and the plurality of inputs of a next layer. The improved perturbations are iteratively applied to the plurality of neurons of each of the plurality of layers.

A learning network is described. The learning network includes learning network inputs, learning network outputs, layers between the learning network inputs and the learning network outputs, and programmable network components between and coupled to the layers. The programmable network components correspond to weights. The programmable network components are programmed by generating a first estimate of a gradient for the learning network, generating subsequent estimates of the gradient using a feedback network that generates improved perturbations over time, and using gradient estimates to determine program the programmable network components in the learning network. In some embodiments, the improved perturbations include lower variance, lower noise, and/or lower magnitude perturbations.

Figure 1A:
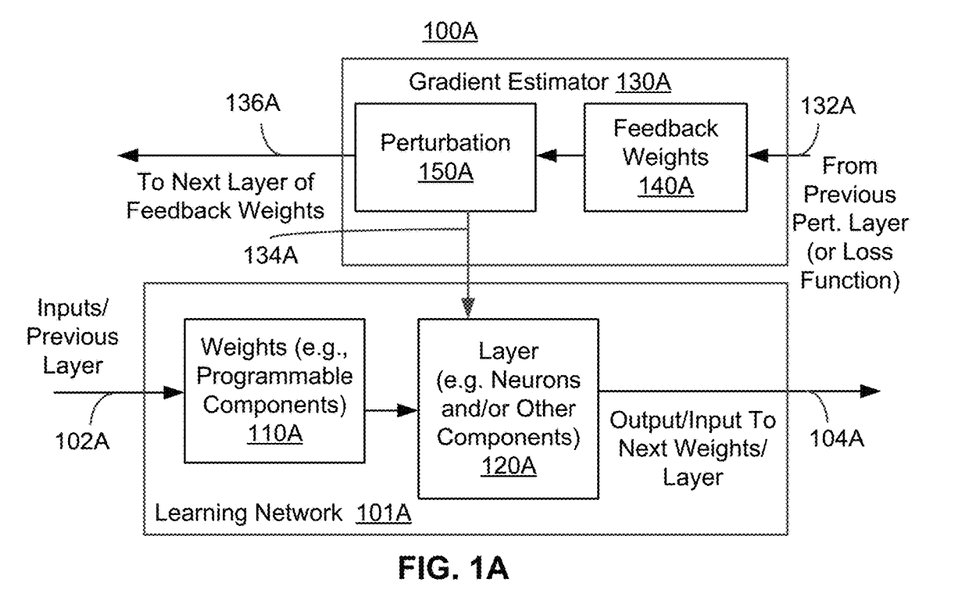
FIGS. 1A-1C depict embodiments of learning systems including a portion of a learning network in conjunction with an embodiment of a portion of a gradient estimator usable in performing machine learning for the learning network.
Figure 1B:
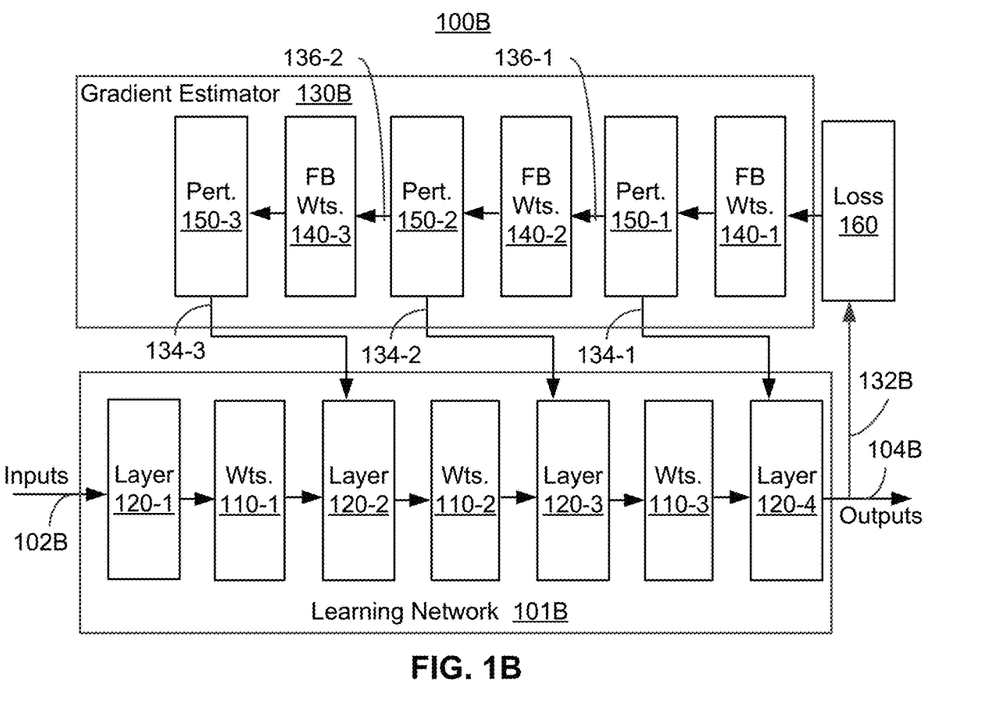
Figure 1C:
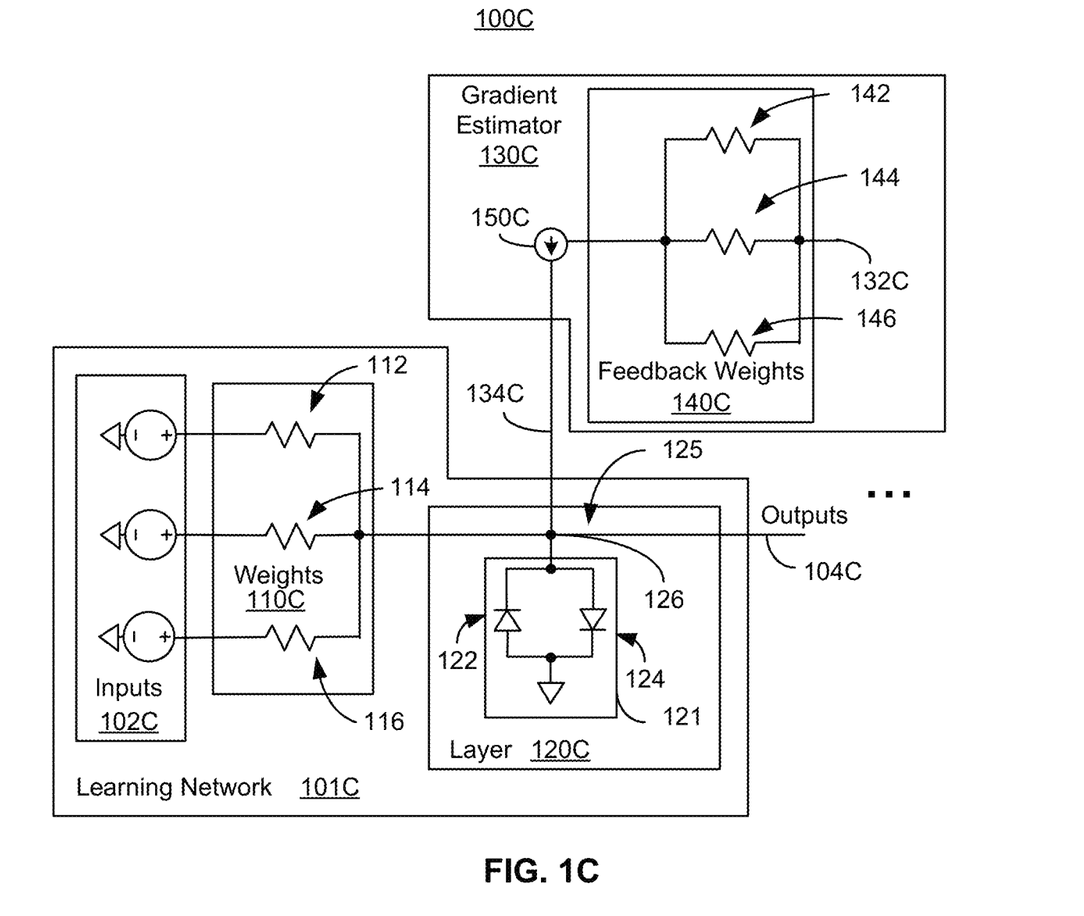

FIGS. 1A-1C depict embodiments of learning systems 100A, 100B, and 100C including portions of learning networks 101A, 101B, and 101C, respectively, in conjunction with portions of gradient estimators 130A, 130B, and 130C usable in performing machine learning for learning networks 101A, 101B, and 101C, respectively. Learning system 100A may be viewed as depicting a single, repeatable portion of a learning network and gradient estimator. Learning system 100B may be viewed as a particular embodiment of a learning network including multiple layers of neurons and weights and a corresponding gradient estimator. Learning system 100C may be viewed as depicting a single, repeatable portion of a simplified implementation of a learning network and gradient estimator. Learning network 101C is only one possible instantiation of the learning systems 101A and/or 101B, wherein 101C is instantiated as an analog system.

Referring to FIG. 1A, learning network 101A is a network capable of learning, such as a neural network. In some embodiments, learning network 101A is part of a larger learning network (e.g. a larger neural network). Learning network 101A includes inputs 102A, weights 110A, layer 120A including neurons and/or other components, and outputs 104A. Inputs 102A, outputs 104A, and the connection between weights 110A and layer 120A are shown as single arrows. In general, however, multiple inputs, multiple outputs, and multiple connections are present. If weights 110A are the first or only set of weights in learning network 101A, then the input signals provided to inputs 102A may be the input for which target values are generally desired to be matched during learning. Otherwise, inputs 102A may receive as input signals the output signals from a previous layer analogous to layer 120A. If layer 120A is the last or only layer of learning network 101A, then outputs 104A provide the outputs that are desired to match the target values. Otherwise, outputs 104A provide outputs to a next set of weights analogous to weights 110A. In some embodiments, input signal(s), output signal(s), and/or target value(s) may be constant or time varying.

Weights 110A includes programmable components, such as a memristors. Weights 110A may be considered to be analogous to synapses in a biological neural network. In some embodiments, the programmable components of weights 110A are fully connected (each weight or programmable components is connected to all of its neighbors). In other embodiments, the programmable components of weights 110A are sparsely connected (not all weights or programmable components connected to all of its neighbors). In some embodiments, the connections between programmable components of weights 110A are programmable. For example, switches may be between some or all of the programmable components. Weights 110A receive inputs signals from inputs 102A and multiply the input signals by the individual weights (e.g. the programmable resistances) to provide weighted inputs to layer 120A. Layer 120A includes components corresponding to neurons, or nodes. Thus, the components (e.g. neurons) of layer 120A receive weighted inputs from weights 110A and combine the weighted inputs based on a function of the weighted inputs to provide one or more outputs. In some embodiments, a separate component is used to update the programmable components (i.e. weights) in weights 110A. In some embodiments, weights 110A includes logic used to update the programmable components.

Learning system 100A uses gradient estimator 130A to perform learning. More specifically, gradient estimator 130A includes inputs 132A, feedback weights 140A, perturbation layer 150A, outputs 134A, and feedback outputs 136A. Inputs 132A, outputs 134A, and feedback outputs 136A are shown as single arrows. In general, however, multiple inputs, multiple outputs, and multiple feedback outputs are present. If feedback weights 130A are the first or only set of feedback weights in gradient estimator 130A, then the input feedback signal provided to inputs 132A corresponds to the loss function for learning network 101A. For example, the magnitude and direction of the loss function (i.e. the size of the difference between the actual outputs and the target values for learning network 101A and whether the actual outputs are greater or less than the target values) may be provided to inputs 132A. In some embodiments, the loss function may be provided as the input feedback signals to inputs 132A. In some embodiments, an estimate of the gradient is provided to inputs 132. Otherwise, inputs 132A may receive as input feedback signals the feedback output signals from a previous layer analogous to perturbation layer 150A. Outputs 134A provide perturbations to learning network 101A. Feedback outputs 136A provide feedback signals to a next set of feedback weights, if present. Otherwise, feedback outputs 136A may be omitted.

Feedback weights 140A are programmable. Thus, feedback weights 140A may include programmable components, such as memristors. In some embodiments, feedback weights 140A are fully connected (each weight or programmable component is connected to all of its neighbors). In other embodiments, the feedback weights 140A are sparsely connected (not all weights or programmable components connected to all of its neighbors). In some embodiments, the connections between feedback weights 140A are programmable. Feedback weights 140A receive inputs signals from inputs 132A and multiply the input signals by the individual feedback weights (i.e. the programmable resistances) to provide weighted inputs to perturbation layer 150A. In some embodiments, a separate component is used to update the programmable components (i.e. weights) in feedback weights 140A. In some embodiments, feedback weights 140A includes logic used to update the programmable components.

Perturbation layer 150A generates perturbations based on the input feedback signals and feedback weights 140A. For example, perturbation layer 150A may draw perturbations from a distribution in a manner that is based on the feedback weights. These perturbations are provided to layer 120A of learning network 101A. The perturbations may be input to the inputs or nodes of layer 120A. Thus, the perturbations may be combined with the weighted inputs that layer 120A receives from weights 110A. In some embodiments, the perturbations generated by perturbation layer 150A are balanced and have a finite inverse second moment. Because they are balanced, perturbations generated by perturbation layer 150A and provided to layer 120A have an equal probability of being positive as being negative (e.g. have a zero mean). For example, the perturbation for a particular neuron may have an equal probability of being positive as being negative. Because the perturbations have a finite inverse second moment, the square of the inverse of the magnitudes (($1/magnitude)^2$) of the perturbations are finite. Thus, the values of the perturbations may not go to zero. For example, if the values of the perturbations are described by a probability distribution, the probability distribution is balanced for positive and negative values and has a region around values of zero excised. Perturbation layer 150A also forwards the weighted feedback signals via feedback outputs 136A.

Referring to FIG. 1B, learning system 100B includes learning network 101B, gradient estimator 130, and loss generator 160. In some embodiments, loss generator 160 may be part of gradient estimator 130B. Loss generator 160 determines the loss function for learning network 101B (i.e. the difference between the target values and output signals for given input signals). In some embodiments, loss generator 160 also determines estimates of the gradient based on the loss function.

Learning network 101B is analogous to learning network 101A. However, learning network 101B includes multiple layers 120-1, 120-2, 120-3, and 120-4 (collectively or generically layer(s) 120), each of which is analogous to layer 120A of learning network 101A. Thus, each of layers 120 may include multiple neurons. Each neuron may combine their weighted inputs based on function(s) for the neurons to provide outputs. In some embodiments, layers 120 are the same. In other embodiments, layer(s) 120 may differ from other layer(s) 120. Learning network 101B also includes multiple sets of weights 110-1, 110-2, and 110-3 (collectively or generically weight(s) 110), each of which is analogous to weights 110A. Thus, weights 110 each includes multiple programmable components that may be sparsely connected, fully connected, and/or have programmable connections. Weights 110 may be the same or different from other weights 120. Thus, learning network 101B may be viewed as including four layers, each of which is analogous to learning network 101A. However, the inputs are not weighted for first layer 120-1. In other embodiments, an additional set of weights may be provided for layer 120-1. In such embodiments, gradient estimator 130B may be extended for the first layer of weights.

Learning network 101B also includes network inputs 102B and network outputs 104B. Network inputs 102B and network outputs 104B are analogous to inputs 102A and outputs 104A. However, network inputs 102B are for first layer 120-1 and receive the input signals for which the output signals are desired to be matched to target values during learning. Similarly, network outputs 104B are for the last layer 120-3. Although four layers 120 and three weights 110 are shown in FIG. 1B, in other embodiments, another number of layers 120 and/or weights 110 may be present.

Gradient estimator 130B is analogous to gradient estimator 130A. However, gradient estimator 130B includes multiple feedback weights 140-1, 140-2, and 140-3 (collectively or generically feedback weight(s) 140), each of which is analogous to feedback weights 140A of gradient estimator 130B. Thus, each of feedback weights 140 may include multiple programmable components that may be sparsely connected, fully connected, and/or have programmable connections. Gradient estimator 130B also includes perturbation layers 150-1, 150-2, and 150-3 (collectively or generically perturbation layer(s) 150), each of which is analogous to perturbation layer 150A. Thus, perturbation layers 150 generate perturbations that are provided to learning network 101B (e.g. to be combined with inputs to layers 120). Further, the perturbations provided by each perturbation layer 150 may be balanced and have a finite inverse second moment. Thus, gradient estimator 130B may be viewed as including three layers, each of which is analogous to gradient estimator 130A. Gradient estimator 130B also includes feedback inputs 132B, outputs 134-1, 134-2, and 134B-3 (collectively or generically output(s) 134), and feedback outputs 136-1 and 136-2 (collectively or generically feedback output(s) 136) that are analogous to feedback inputs 132A, outputs 134A, and feedback outputs 136A, respectively. Although three perturbation layers 150 and three feedback weights 140 are shown in FIG. 1B, in other embodiments, another number of perturbation layers 150 and/or feedback weights 140 may be present.

Referring to FIG. 1C, learning system 100C includes learning network 101C and gradient estimator 130C. Learning system 100C is thus analogous to learning system 100A. In some embodiments, learning network 101C is part of a larger learning network (e.g. a larger neural network). Learning network 101C may be replicated in parallel to provide a first layer in a more complex learning system. Such a first layer may be replicated in series, with the output of one layer being the input for the next layer. In some such embodiments, the programmable network layers and/or the nonlinear activation layers need not be the same. Similarly, gradient estimator 130C may be replicated in parallel to provide gradient estimates for a more complex learning system. Such a first layer may be replicated in series, with the output of one layer being the input for the next layer. Such a gradient estimator may be used in connection with a deeper learning network. Further, the particular configuration of learning network 101C and gradient estimator 130C are for explanatory purposes only and not intended to limit the configurations of learning systems 100A and/or 100B.

Learning network 101C includes inputs 102C, weights 110C, layer 120C including a neuron 125, and outputs 104C. Weights 110C of learning network 100C includes programmable components. More specifically, weights 110C includes programmable resistors 112, 114 and 116. In some embodiments, programmable resistors 112, 114 and 116 are memristors. However, other and/or additional programmable passive components may be used in some embodiments.

Layer 120C includes a neuron 125 including a node 126 and nonlinear activation layer 121. Activation layer 121 defines the function by which input signals are combined by neuron 125. In the embodiment shown, activation layer 121 includes a two-terminal circuit element whose I-V curve is weakly monotonic. In the embodiment shown, nonlinear activation layer 121 includes diodes 122 and 124. Diodes 122 and 124 are used to create a sigmoid nonlinearity as activation function. In other embodiments, a more complex nonlinear activation layer having additional resistors and/or a different arrangement of resistors including more nodes and multiple activation functions might be used.

Gradient estimator 130C includes feedback weights 140C and perturbation layer 150C. Feedback weights 140C includes programmable components. More specifically, feedback weights 140C includes programmable resistors 142, 144 and 146. In some embodiments, programmable resistors 142, 144 and 146 are memristors. However, other and/or additional programmable passive components may be used in some embodiments. Perturbation layer 150C perturbs the signals input to node 126 of neuron 125.

Operation of learning systems 100A, 101B, and/or 100C is described in the context of learning system 100B. However, operation of such learning systems may be extended to other analogous learning systems.

Input signals (e.g. an input vector) are provided to layer 120-1 of learning network 101B. In other words, learning network 101B is to perform an inference. Learning network 101B thus provides output signals via outputs 104B. The output signals are based on the resistances (i.e. weights) of weights 110, perturbations provided to layers 120 by perturbation layers 150, and the configuration of layers 120 (e.g. the configuration of neurons with layers 120). In some embodiments, each perturbation provided is unique and independent of the remaining perturbations. Further, the perturbations propagate through learning network 101B (e.g. through layers 120).

During this first iteration, the feedback weights (e.g. impedances and/or conductances of programmable components) in feedback weights 140 may not be set based on learning network 101B. For example, feedback weights 140 may have initial settings that are random or quasi-random (i.e. randomized), all the same, or otherwise generally unrelated to the desired settings for weights 110. In other embodiments, feedback weights 140 may have an initial setting that is based on knowledge of learning network 101B, the input signals, and/or the target values. For example, feedback weights 140 may be initially set to match previous weights determined to provide the desired values for weights 110 for other analogous tasks. As a result, the perturbations provided for the first iteration need not (and generally do not) reflect the desired weights 110 for the target values. Based on the input signals, the current settings for the weights 110, the (generally randomized) perturbations provided to layers 120 by perturbation layers 150, and the configuration of layers 120, output signals are provided by learning network 101B for the first iteration.

Loss generator 160 determines the loss based on the target values and output signals. The loss function or analogous information corresponding to the loss function is provided to gradient estimator 130B. In some embodiments, the magnitude and direction of the change in the loss function is provided to gradient estimator 130B. In some embodiments, this input to gradient estimator 130B may be considered a first gradient estimate determined based on the loss function for the current settings for weights 110 and layer 120. Feedback weights 140 are updated based on the loss function and the consequently calculated perturbations. The loss function may also be used to update weights 110.

Based on updated feedback weights 140 and the first estimate of the gradient provided to gradient estimator 130B, perturbation layers 150-1, 150-2, and 150-3 generate perturbations for corresponding layers 120-4, 120-3, and 120-2, respectively. Each perturbation may be unique and independent of the remaining perturbations. Further, the perturbations may be improved over the perturbations used in the first iteration. Thus, the perturbations for the second iteration may have lower variance lower noise, and/or lower magnitude than the perturbations generated for the first iteration. The perturbations for the second iteration may also be more aligned with (i.e. closer to) the gradient for learning network 101B, thus allowing for fine-tuning of the programmable network 101B Another inference is performed by learning network 101B. The inference is based on the (same) input signals provided to inputs 102B, weights 110, layers 120, and the (updated) perturbations provided from perturbation layers 150. Thus, new output signals are generated based on the (same) input signals, the perturbations provided using updated feedback weights, and weights 110. In some embodiments, weights 110 might also be updated iteratively.

The process of determining the gradient estimates (e.g. the loss function and/or analogous information), updating feedback weights 140, generating new perturbations by perturbation layers 150, and performing inference(s) using the new perturbations is iteratively repeated. In some embodiments, the process is iteratively repeated until some criteria are met. For example, the criteria may be or include the loss function meeting or being better than a threshold.

Operation of learning system 100B may also be understood as follows. If the perturbations provided to learning network 101B in the first iteration exactly correspond to the gradient between the current settings for weights 110 and the desired settings for the target output, then after one iteration, the gradient may be determined. If such a set of perturbations is provided, feedback weights 140 are aligned with the gradient. In general, however, feedback weights 140 are not initially configured to align with the gradient and perturbations provided do not initially correspond to the gradient. To achieve this alignment, feedback is used. The gradient estimate is provided to gradient estimator 130. The updating of feedback weights 140 based on the gradient estimate allows the perturbations provided by perturbation layer 150 to be directed toward the perturbations corresponding to the gradient. Thus, perturbations iteratively grow closer to matching the gradient and have a smaller variance. A close estimate of the gradient may then be achieved. Weights 110 may be updated to desired settings for the target values.

Using learning system 100B, machine learning using learning network 101B may be improved. Perturbations provided by gradient estimator 130B to learning network 101B improve over multiple iterations. More specifically, the variances of the perturbations provided for a particular iteration are generally lower than the variances of perturbations for prior iteration(s). In some embodiments, the perturbations for subsequent iteration(s) monotonically improve (e.g. have continually lower variances) over perturbations for previous iterations. Further, feedback weights 140 are trained to more closely match the actual gradient between the current settings for weights 110 (e.g. the current impedances for a given iteration) and the desired settings for weights 110 that will achieve the target values. Because of the reduced variances for perturbations provided by perturbation layers 150, the feedback weights provide an estimate of the gradient that sufficiently matches the actual gradient in fewer iterations. Weights 110 are updated based on this estimate of the gradient. Thus, learning network 101B is more rapidly trained. Further, learning network 101B need not be symmetric or meet other restrictions required for other machine learning techniques, such as equilibrium propagation or feedback alignment. In some embodiments, any learning network may be trained. Thus, a wider variety of learning networks 101B may be trained. In addition, measurements of the output signals are used in training learning network 101B. Thus, explicit knowledge of layers 120 may not be needed to train learning network 101B. This is in contrast to techniques such as back propagation. Learning systems 100A and/or 100C may share the benefits of learning system 100B. Thus, learning system(s) 100A, 100B, and/or 100C allow a wider variety of learning networks 101A, 101B and/or 101C to more readily and rapidly carry out machine learning without explicit knowledge of the gradients between layers 120A and/or 120. Thus, performance of learning system 100A, 100B, and/or 100C may be improved.

Figure 2:
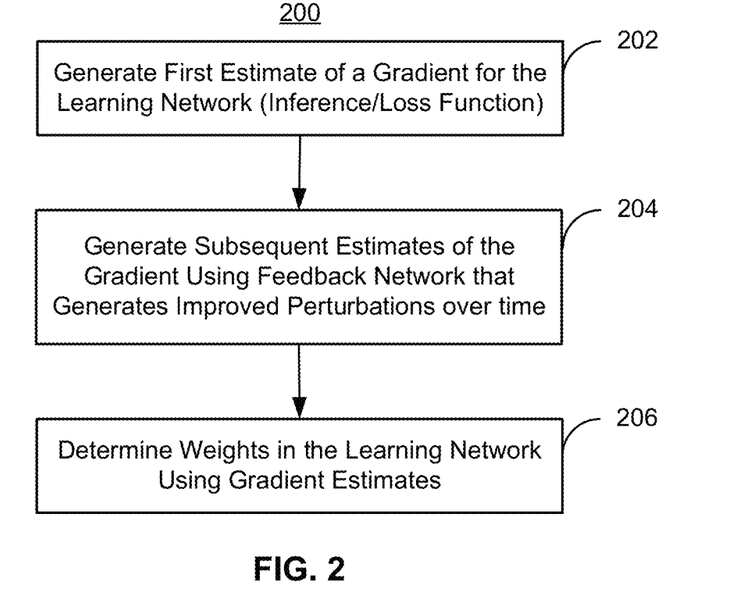
FIG. 2 is a flow chart depicting an embodiment of a method for performing machine learning for the learning network.

FIG. 2 is a flow chart depicting an embodiment of method 200 for performing machine learning for a learning network. For clarity, only some steps are shown. Other and/or additional procedures may be carried out in some embodiments. Further, some steps may be omitted, performed in another order (including in parallel), and/or may have substeps.

A first estimate of a gradient for the learning network is generated, at 202. In some embodiments, the first estimate is based on a loss function. Thus, as part of 202, the learning network performs inference(s) for input signals. Further, the inference(s) may be performed in the presence of perturbation(s). In some embodiments, the perturbations are provided by a gradient estimator. The perturbations may be randomized for the inference(s) performed as part of 202. The loss function compares the output signals for the inference(s) to target values for the input signals.

Subsequent estimates of the gradient are provided using a feedback network that generates improved perturbations over time, at 204. In some embodiments, the improved perturbations are balanced and have a finite inverse second moment. The improved perturbations may be determined based on importance sampling (e.g. sampling that is biased toward the gradient for the learning network) of a perturbation distribution. In such embodiments, the perturbation distribution is balanced and has a finite inverse second moment. Thus, the perturbations provided as part of 204 are biased in the direction of the gradients for the learning network (e.g. in the direction of steepest descent toward the target values).

The subsequent estimates of the gradient may be iteratively generated at 204. A particular subsequent estimate may be provided by performing an iteration of a process that includes updating the perturbations based on the gradient estimate of a previous iteration; performing an inference using the input signal(s) and the updated perturbations; determining the difference between the output signals and the target values (i.e. the loss function); and generating the new gradient estimate based on the loss function. The perturbations may be updated for each iteration and improve over multiple iterations. In some embodiments, the improved perturbations are lower variance from the gradient, lower noise, and/or lower magnitude perturbations. As iterations are performed, therefore, the perturbations may align with the actual gradient. In some embodiments, the improved perturbations are generated using feedback weights. The feedback weights are updated using the previous gradient estimate. The updated feedback weights provide a closer approximation of the gradients for the learning system. In other embodiments, the improved perturbations may be generated in another manner.

The method also includes using the gradient estimates to determine the weights in the learning network, at 206. In some embodiment, 206 is performed in response to criteria (e.g. an upper threshold on the loss function) being met or exceeded). In some embodiments, 206 is also performed more frequently. For example, the weights in the learning network may be updated after a fixed number of iterations. In some embodiments, the generation of subsequent estimates of the gradient at 204 and updating of the weights at 206 may both be performed during iterations described above. The iterative process may be completed when the output signals are sufficiently close (e.g. within a threshold) of the target values.

For example, a first gradient estimate may be determined using loss generator 160, at 202. In some embodiments, this is achieved by providing initial, generally randomized perturbations from gradient estimator 130B to learning network 101B and performing inference(s) for input signals provided to learning network 101B. Loss generator 160 compares the outputs signals to target values for the input signals and generates a first gradient estimate. In some embodiments, gradient estimator 130B may provide the gradient estimate.

Subsequent gradient estimates are provided using the feedback network of gradient estimator 130B and perturbations generated by gradient estimator 130B, at 204. This may be accomplished iteratively. For example, the perturbations provided by perturbation layers 150 are updated based on the gradient estimate of a previous iteration. Thus, the gradient estimate determined for one iteration is used in the next iteration. In some embodiments, updating the perturbations includes adjusting feedback weights 140 based on the gradient estimate of the previous iteration. An inference is performed using the input signal(s), the updated perturbations from gradient estimator 130B, and weights 110. Loss generator 160 determines the difference between the output signals and the target values. The new gradient estimate is determined based loss function. Weights 110 may also be updated based on the previous gradient estimate, at 206.

Using learning method 200, machine learning may be improved. Perturbations provided to the learning network improve (reduce in variance) over multiple iterations. Because of the reduced variances for perturbations provided at 204, the subsequent estimates of the gradient may grow closer to the actual gradient in fewer iterations. Weights for the learning network are updated based on these estimates of the gradient. Thus, method 200 more rapidly (i.e. in fewer iterations) trains the learning network. Further, method 200 may not place restrictions on the learning network. This approach is in contrast to techniques such as equilibrium propagation and feedback alignment. For example, the learning network trained using method 200 need not be symmetric, avoid contraction between layers of neurons, or meet other restrictions required for various other machine learning techniques. In some embodiments, any learning network may be trained. Thus, method 200 is usable in training a wider variety of learning networks. In addition, measurements of the output signals (i.e. the loss function) and estimates of the gradient are used by method 200. Detailed information of the characteristics of layers within the learning network may not be needed and explicit calculation of gradients need not be made. This is in contrast to techniques such as back propagation. Thus, method 200 more rapidly and readily trains a wide variety of learning networks.

Figure 3:
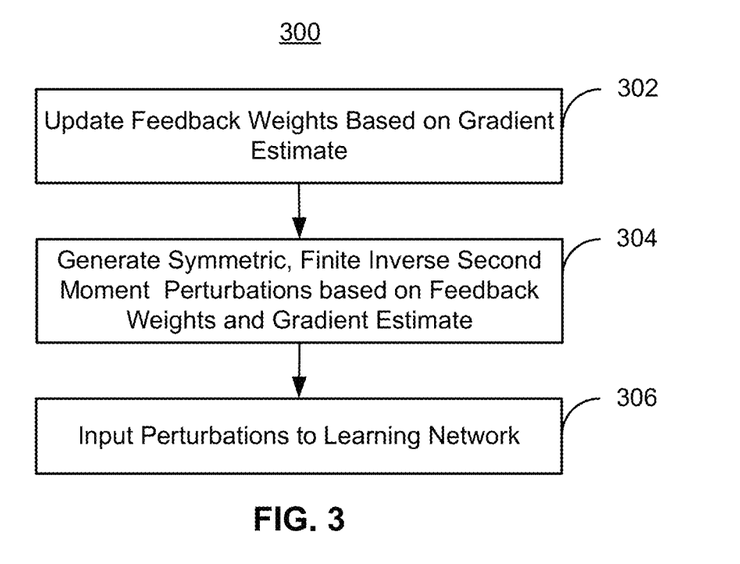
FIG. 3 is a flow chart depicting an embodiment of a method for performing machine learning for the learning network.

FIG. 3 is a flow chart depicting an embodiment of method 300 for performing machine learning for the learning network. More specifically, method 300 that generates improved perturbations for an iteration of method 200. For clarity, only some steps are shown. Other and/or additional procedures may be carried out in some embodiments. Further, some steps may be omitted, performed in another order (including in parallel), and/or may have substeps. In some embodiments, method 300 is performed by a gradient estimator such as gradient estimators 130A and/or 130B. Thus, method 300 may be used in a gradient estimator that uses feedback weights and perturbation layers.

Feedback weights are updated based on the gradient estimate (e.g. based on the loss function) for an inference or inferences, at 302. For example, the feedback weights may be adjusted to reduce the error between the predicted gradient of the feedback network and the estimated gradient provided via stochastic approximation. Perturbations are generated based on the gradient estimate and feedback weights, at 304. Thus, the weighted feedback signals may be input to the perturbation layers, which generate the perturbations based on the inputs. The perturbations generated at 304 may be obtained from a distribution that is balanced (has a zero mean) and has a finite inverse second moment. The perturbations also have lower variance from the gradient, lower noise, and/or lower magnitude than perturbations generated for previous iteration(s). In some embodiments, the variance decreases monotonically for each iteration. The perturbations are provided to the learning network, at 306. Using the perturbations, the learning network may perform an inference, from which a new gradient estimate may be determined.

Using method 300, machine learning may be improved. Perturbations provided to the learning network improve (reduce in variance) over multiple iterations. Because of the reduced variances for perturbations provided at 304, the subsequent estimates of the gradient may grow closer to the actual gradient in fewer iterations. Thus, method 300 may be used to more rapidly (i.e. in fewer iterations) train a learning network. Further, method 300 may not place significant restrictions on the learning network. This is in contrast to techniques such as equilibrium propagation and feedback alignment. Thus, method 300 is usable in training a wider variety of learning networks. In addition, measurements of the output signals (i.e. the loss function) and estimates of the gradient are used by method 300. Detailed information of the layers within the learning network may not be needed and explicit calculation of gradients need not be made. Thus, method 300 may be used in more rapidly and readily training a wide variety of learning networks.

Figure 4:
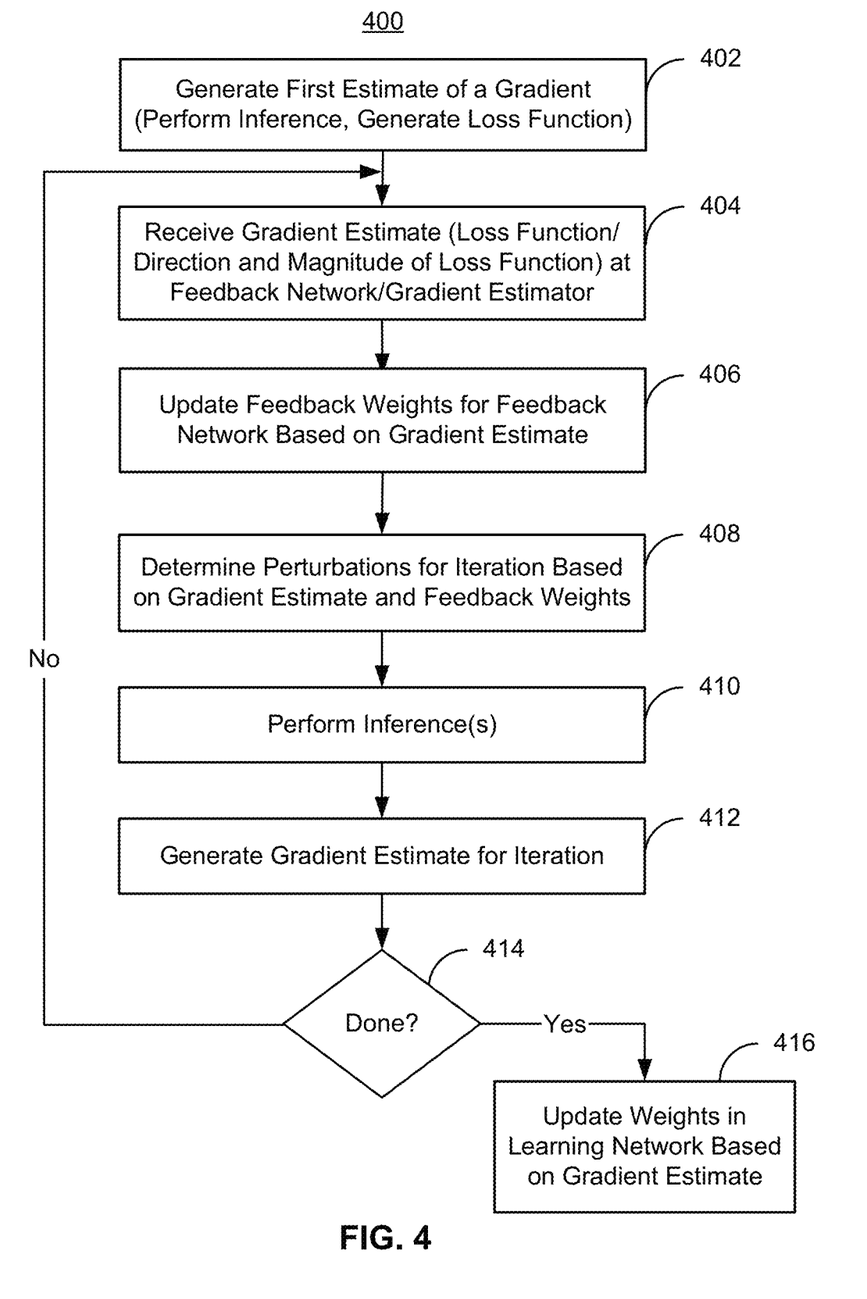
FIG. 4 is a flow chart depicting an embodiment of a method for performing machine learning for the learning network.

FIG. 4 is a flow chart depicting an embodiment of method 400 for performing machine learning for a learning network. For clarity, only some steps are shown. Other and/or additional procedures may be carried out in some embodiments. Further, some steps may be omitted, performed in another order (including in parallel), and/or may have substeps.

A first estimate of a gradient for use in a feedback network is generated, at 402. In some embodiments, the first estimate is based on a loss function. Thus, as part of 402, the learning network performs inference(s) for input signals. Further, the inference(s) may be performed as part of 402 in the presence of perturbation(s). In some embodiments, the perturbations are provided by a gradient estimator. The perturbations may be randomized for the inference(s) performed as part of 402. The loss function compares the output signals for the inference(s) to target values for the input signals. In some embodiments, multiple inferences may be performed as part of 402. Because multiple inferences are performed, weights for the learning network may be updated based on the loss function, without use of a feedback network that generates perturbations. Thus, some training of the learning network may be performed before perturbations are trained as part of 402.

The gradient estimate and/or analogous information (e.g. the loss function, the magnitude and direction of the difference between the output signals and the target values) is received at a feedback network (i.e. at a gradient estimator), at 404. The feedback weights are updated based on the gradient estimate, at 406. The feedback weights are adjusted to be closer to weights that can be used to generate the gradient for the network undergoing learning. The perturbations are determined using the feedback weights and the gradient estimate, at 408. In some embodiments, the feedback weights are multiplied with the gradient estimate (or other information input to the feedback weights) and perturbations generated based on the resultant. The perturbations are improving (i.e. have a reduced variance and/or are more aligned with the gradient). Inference(s) are performed by the learning network, at 410.

A new gradient estimate is generated using the newly provided perturbations, at 412. Thus, the loss function for the output signals generated by the inference is calculated. The difference between the current loss function and previous loss function(s) may also be determined. At 414 it is determined whether learning is completed. For example, it may be determined whether the loss function meets a threshold. If not, then the process returns to 404. Thus, another iteration is performed. If so, then then the weights in the learning network (e.g. in the inference path) are updated based on the gradient estimate. In some embodiments, the weights in the learning network may be updated more frequently. The method 400 then terminates.

For example, learning system 100B may utilize method 400 for learning. A first gradient estimate may be determined using loss generator 160, at 402. In some embodiments, this is achieved by providing initial, generally randomized perturbations from gradient estimator 130B to learning network 101B and performing inference(s) for input signals provided to learning network 101B. Thus, 402 may be analogous to 202 of method 200.

The gradient estimate and/or analogous information is received at the gradient estimator 130, at 404. Feedback weights 140 are updated based on the gradient estimate of the previous iteration, at 406. The perturbations are determined based on the feedback weights and gradient estimate, at 408. These perturbations are provided to learning network 101B, at 410. An inference is performed using the input signal(s), the updated perturbations from gradient estimator 130B, and weights 110, at 412. Loss generator 160 determines the difference between the output signals from the inference and the target values, at 412. The new gradient estimate is determined based on the perturbation of the loss function. At 414 it is determined whether learning is completed. For example, it may be determined whether the loss function meets a threshold. If not, then 404 is returned to. Thus, another iteration is performed. If so, then then weights 110 are updated and method 400 terminates.

Using learning method 400, machine learning may be improved. Perturbations provided to the learning network improve (reduce in variance) over multiple iterations. Because of the reduced variances for perturbations provided at 410, the subsequent estimates of the gradient may grow closer to the actual gradient in fewer iterations. Weights for the learning network are updated based on these estimates of the gradient. Thus, method 400 more rapidly (i.e. in fewer iterations) trains the learning network. Further, method 400 may not place restrictions on the learning network. This is in contrast to techniques such as equilibrium propagation and feedback alignment. For example, the learning network trained using method 400 need not be symmetric, avoid contraction between layers of neurons, or meet other restrictions required for various other machine learning techniques. In some embodiments, any learning network may be trained. Thus, method 400 is usable in training a wider variety of learning networks. In addition, measurements of the output signals (i.e. the loss function) and estimates of the gradient are used by method 400. Detailed information of the characteristics of layers within the learning network may not be needed and explicit calculation of gradients need not be made. This is in contrast to techniques such as back propagation. Thus, method 200 more rapidly and readily trains a wide variety of learning networks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of training a learning network, comprising:
   generating a first estimate of a gradient for the learning network;
   generating subsequent estimates of the gradient using a feedback network that generates improved perturbations for the subsequent gradient estimates, a plurality of gradient estimates including the first estimate of the gradient and the subsequent estimates of the gradient; and
   using the plurality of gradient estimates to determine modifications to weights in the learning network.

2. The method of claim 1, wherein the improved perturbations include lower variance, lower noise, or lower magnitude perturbations.

3. The method of claim 1, wherein the using the plurality of gradient estimates to determine the modifications to the weights further includes:
   iteratively determining the weights in the learning network.

4. The method of claim 3, wherein the generating subsequent estimates includes:
   receiving, at the feedback network for an iteration, a gradient estimate of the plurality of gradient estimates;
   determining perturbations for the iteration using the feedback network and the gradient estimate, the improved perturbations including the perturbations;
   providing the perturbations to the learning network; and
   providing, for the iteration, a new gradient estimate of the plurality of gradient estimates based on the perturbations; and wherein the wherein iteratively determining the weights further includes
   updating the weights in the learning network based on a particular gradient estimate.

5. The method of claim 4, wherein the determining the perturbations for the iteration further includes:
   updating feedback weights for the feedback network.

6. The method of claim 1, wherein the improved perturbations are balanced and have a finite inverse second moment.

7. The method of claim 1, wherein the improved perturbations are determined based on importance sampling of a perturbation distribution, the perturbation distribution being balanced and having a finite inverse second moment.

8. The method of claim 1, wherein the plurality of gradient estimates is a plurality of output layer gradient estimates, the output layer being a last layer of a plurality of layers in the learning network.

9. The method of claim 1, wherein the learning network is a neural network.

10. The method of claim 9, wherein the learning network has a plurality of layers, each of the plurality of layers including a plurality of neurons having a plurality inputs and a plurality of outputs, wherein a portion of the weights are between the plurality of outputs of a layer of the plurality of layers and the plurality of inputs of a next layer of the plurality of layers, and wherein the improved perturbations are iteratively applied to the plurality of neurons of each of the plurality of layers.

11. A method of training a neural network, comprising:
generating a first estimate of a gradient for the neural network;
generating subsequent estimates of the gradient using a feedback network that generates lower variance perturbations for the subsequent gradient estimates, the lower variance perturbations being balanced and having a finite inverse second moment, a plurality of gradient estimates including the first estimate of the gradient and the subsequent estimates of the gradient, the plurality of gradient estimates being a plurality of output layer gradient estimates, the generating the subsequent estimates further comprising
receiving, at the feedback network for an iteration, a gradient estimate of the plurality of gradient estimates;
updating feedback weights for the feedback network;
determining perturbations for the iteration using the feedback network, the feedback weights, and the gradient estimate, the lower variance perturbations including the perturbations;
providing the perturbations to the neural network; and
providing, for the iteration, a new gradient estimate of the plurality of gradient estimates based on the perturbations; and
using the plurality of gradient estimates to iteratively determine weights in the neural network.

12. A learning network, comprising:
a plurality of learning network inputs;
a plurality of learning network outputs;
a plurality of layers between the plurality of learning network inputs and the plurality of learning network outputs; and
a plurality of programmable network components between and coupled to the plurality of layers, the plurality of programmable network components corresponding to a plurality of weights;
wherein the plurality of programmable network components is programmed by generating a first estimate of a gradient for the learning network, generating subsequent estimates of the gradient using a feedback network that generates improved perturbations for the subsequent gradient estimates, a plurality of gradient estimates including the first estimate of the gradient and the subsequent estimates of the gradient, and using the plurality of gradient estimates to determine modifications to the weights in the learning network.

13. The learning network of claim 12, wherein the improved perturbations include lower variance perturbations.

14. The learning network of claim 12, wherein the using the plurality of gradient estimates to determine the weights further includes iteratively determining the weights in the learning network.

15. The learning network of claim 14, wherein iteratively determining the weights further includes receiving, at the feedback network for an iteration, a gradient estimate of the plurality of gradient estimates, determining perturbations for the iteration using the feedback network and the gradient estimate, the improved perturbations including the perturbations, providing the perturbations to the learning network, and providing, for the iteration, a new gradient estimate of the plurality of gradient estimates based on the perturbations, and updating the weights in the learning network based on a particular gradient estimate.

16. The learning network of claim 15, wherein the determining the perturbations for the iteration further includes updating feedback weights for the feedback network.

17. The learning network of claim 12, wherein the improved perturbations are balanced and have a finite inverse second moment.

18. The learning network of claim 12, wherein the improved perturbations are determined based on importance sampling of a perturbation distribution, the perturbation distribution being balanced and having a finite inverse second moment.

19. The learning network of claim 12, wherein the plurality of gradient estimates is a plurality of output gradient estimates from the plurality of learning network outputs of the learning network.

20. The learning network of claim 12, wherein the learning network is a neural network.

* * * * *

UNITED STATES PATENT AND TRADEMARK OFFICE
CERTIFICATE OF CORRECTION

PATENT NO. : 11,615,316 B1
APPLICATION NO. : 17/948108
DATED : March 28, 2023
INVENTOR(S) : Jack David Kendall It is certified that error appears in the above-identified patent and that said Letters Patent is hereby corrected as shown below:

In the Claims

In Column 14, Line(s) 52, Claim 4, after "and wherein", delete "the wherein".

Signed and Sealed this
Twenty-fourth Day of October, 2023

Katherine Kelly Vidal
*Director of the United States Patent and Trademark Office*